(No Model.)

E. W. MACKENZIE-HUGHES.
CAR COUPLING.

No. 467,172.  Patented Jan. 19, 1892.

Witnesses:  Inventor:

UNITED STATES PATENT OFFICE.

EDWARD WILLIAM MACKENZIE-HUGHES, OF ERICSTANE, HELENSBURGH, SCOTLAND.

CAR-COUPLING.

SPECIFICATION forming part of Letters Patent No. 467,172, dated January 19, 1892.

Application filed June 17, 1891. Serial No. 396,608. (No model.) Patented in England June 4, 1891, No. 9,463.

*To all whom it may concern:*

Be it known that I, EDWARD WILLIAM MACKENZIE-HUGHES, a citizen of the United Kingdom of Great Britain and Ireland, residing at Ericstane, Helensburgh, in the county of Dumbarton, Scotland, have invented new and useful Improvements in Car-Couplings, (which have not been patented in any country except Great Britain, by Letters Patent dated June 4, 1891, No. 9,463;) and I do hereby declare that the following is a full, clear, and exact description of the invention, which will enable others skilled in the art or manufacture to which it relates to make and use the same.

This invention has for its object improvements in the manufacture of couplings for railway carriages, cars, and wagons, and whereby the coupler can be made entirely from wrought-iron or steel instead of cast-iron or partly of cast and partly of wrought metal, as heretofore, the improved coupler being much lighter in weight and of greater strength than couplers as ordinarily made.

The method of manufacture constituting my invention is illustrated by Figures 1 to 6 of the accompanying drawings.

Figure 1:
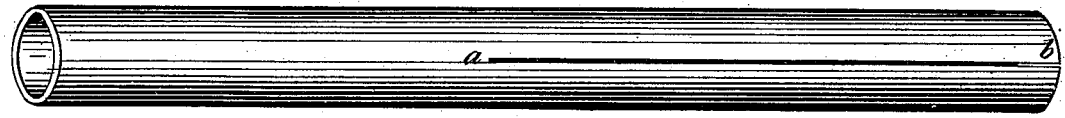
Figure 2:
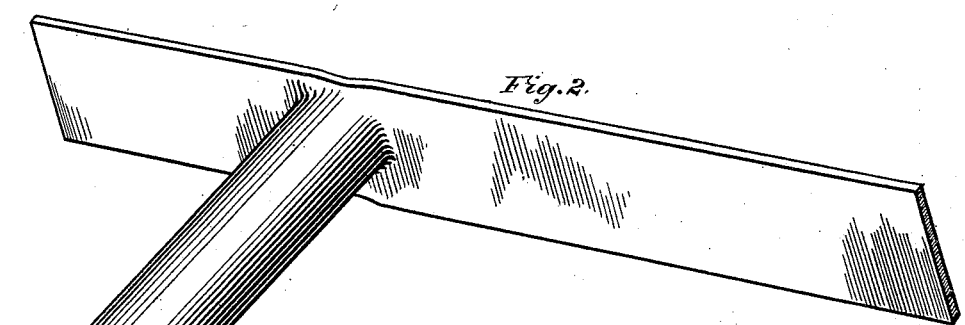
Figure 3:
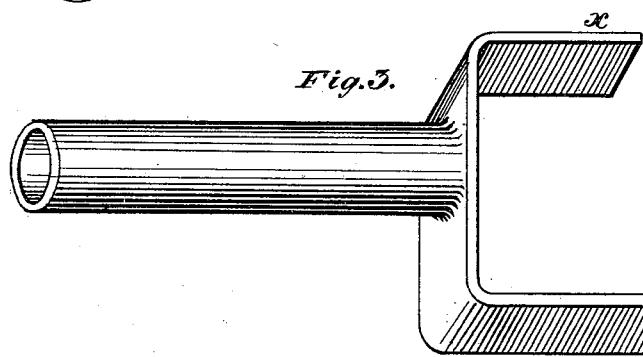
Figures 4, 5:
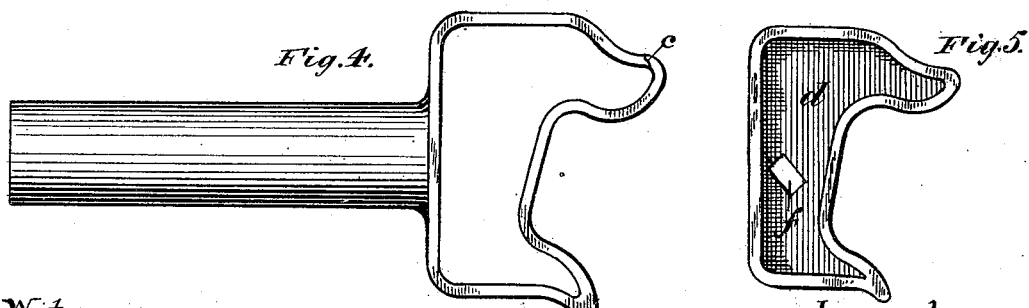

Fig. 1 shows the initial process in the manufacture; Fig. 2, the second process; Fig. 3, the third process; Fig. 4, the fourth process. Fig. 5 shows a part of the coupler-head, and Fig. 6 the completed coupler.

The improved method of construction can be applied to any form of coupler, it being understood that I do not claim as part of my invention any particular design, and for illustrative purposes I have depicted the type made by the Standard Car-Coupling Company, of Troy, State of New York, United States of America.

Figure 6:
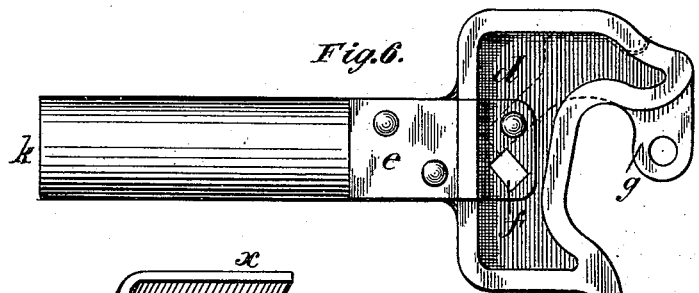

As shown by the drawings, the shank and the walls of the coupler-head are made from one piece of wrought-iron or steel, the latter by preference, and in the manufacture a solid tube of any required length, diameter, and thickness of wall is used. As seen by Fig. 1, this tube is sawed or split between the points $a$ and $b$. After being reheated the split part is by hydraulic or other pressure spread or flared out at right angles to the unsplit part of the tube, as seen at Fig. 2, the flared part being then placed in a cramp or between dies and bent to the form shown by Fig. 3, a piece being cut off one of the legs $x$, after which by other dies or formers the legs are shaped round, as illustrated by Fig. 4, to constitute the walls of the coupler-head, and the ends are then welded at $c$ by electric welding or otherwise, or when the parts $x$ are left of equal length the weld is at another point. Top and bottom gusset or web plates $d$, stamped out of wrought metal, as shown at Fig. 5, are then inserted in the space so inclosed by the walls of the head and welded in position, the complete body of the coupler being thereby formed, as seen at Fig. 6, with the exception of the forging marked $e$, which is subsequently riveted on to constitute a stop-plate and prevent the coupler from turning round when in service. Holes $f$ are made in the stop-plate $e$ and in the gusset or web plates $d$ to receive the locking-pin of the knuckle $g$, the latter being made from a solid block of wrought metal and working between the gusset or web plates $d$ in the usual manner—that is to say, in a hole in the coupler-face, which is punched in the walls before bending or welding takes place and subsequently machined out.

Having now described the invention, what I desire to claim and secure by Letters Patent is—

1. In a car-coupler, a combined wrought-metal shank and draw-head body, composed of a tube, part of which constitutes the shank, the remainder being split, flared, and shaped to the desired contour and welded to constitute the walls of the coupler-head, substantially as described.

2. In a car-coupler, a shank and draw-head body formed from a single piece of wrought-metal tube, as set forth, in combination with two stamped wrought-metal gusset-plates welded or otherwise united to said draw-head body, substantially as described.

3. In a car-coupler, the combination of a shank and draw-head body formed integral with each other from a single piece of wrought-metal tube, substantially as set forth, stamped wrought-metal gusset-plates welded or otherwise united to said draw-head body, and a wrought-metal coupling-knuckle situated between said gusset-plates and acting in the usual manner, substantially as described.

4. In a car-coupler, the combination of a shank and draw-head body formed integral with each other from a single piece of wrought-metal tube, substantially as set forth, wrought-metal stamped gusset-plates welded or otherwise united to said draw-head body, a wrought-metal coupling-knuckle acting between said gusset-plates, and a stop-plate riveted or otherwise secured to said shank and one gusset-plate, said stop-plate and gusset-plate having holes for the reception of a bolt to lock the coupling-knuckle, substantially as described.

In witness whereof I have hereunto set my hand and seal this 5th day of June, 1891.

EDWARD WILLIAM MACKENZIE-HUGHES. [L. S.]

Witnesses:
    GEO. M. CRUIKSHANK,
*Fel. Inst. Patent Agents, 62 St. Vincent St., Glasgow.*
    JOHN ARMSTRONG, Junr.,
*Clerk, 62 St. Vincent St., Glasgow.*